No. 804,269. PATENTED NOV. 14, 1905.
H. E. ROSS.
CONSTRUCTION OF THE HULLS OF SHIPS AND BOATS.
APPLICATION FILED APR. 4, 1905.

Witnesses

Inventor
Herbert Ernest Ross

ATTORNEYS

UNITED STATES PATENT OFFICE.

HERBERT ERNEST ROSS, OF SYDNEY, NEW SOUTH WALES, AUSTRALIA.

CONSTRUCTION OF THE HULLS OF SHIPS AND BOATS.

No. 804,269.  Specification of Letters Patent.  Patented Nov. 14, 1905.

Application filed April 4, 1905. Serial No. 253,747.

*To all whom it may concern:*

Be it known that I, HERBERT ERNEST ROSS, a subject of the King of Great Britain and Ireland, and a resident of Equitable Buildings, George street, Sydney, in the State of New South Wales, Commonwealth of Australia, have invented a certain new and useful Improved Construction of the Hulls of Ships and Boats, (for which I have applied for a patent in the Commonwealth of Australia, No. 2,641, and bearing date March 2, 1905,) of which the following is a specification.

In giving effect to the invention the hull of a vessel is constructed on novel lines, whereby (*a*) the wave displacement shall be reduced to a minimum; (*b*) the submerged surfaces shall be reduced when the vessel is moving with speed; (*c*) the skin-friction on the bottom will be reduced when the vessel is moving, such reduction of friction being effected by an automatic generation of air-bubbles adjacent to the skin when the vessel is in motion.

The type of hull at present almost universally in vogue cleaves the water at the bows, the energy of the motive power, which forces the hull through the water, being largely expended in displacing the mass of water in front of the ship.

The special object of the present invention is to provide such a construction of hull that the vessel shall have a tendency to skim or glide, as nearly as possible, over the surface of the water. To this end the plan of the hull will be an oblong or parallelogram in contour, with vertical or approximately vertical sides depending from the long edges of the parallelogram. The bottom edges of the sides and the external bottom will each form a convex curve, deepest at the center and tapering to zero at both ends, or, briefly stated, each will be a segment of a circle of which the deck of the ship will be parallel or thereabout to the chord. Between the segmental sides the external bottom will be transversely concaved. The stern may be made flat, so as to lie on the surface of the water, a construction which is at present in use. When screw propulsion is employed, the propeller-shaft may be inclosed and the stern-clearance be of solid dead-wood, or the shaft may be left bare.

In order that the invention may be properly understood, reference is made to the accompanying sheet of drawings, in which—

Figure 1:
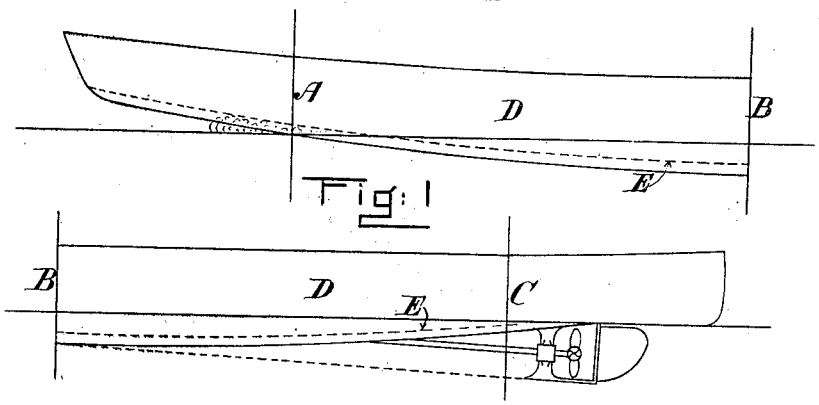
Figure 2:
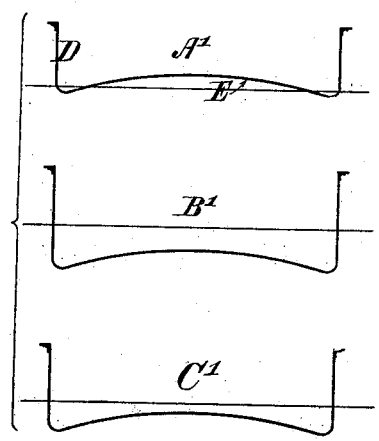
Figure 2:

Figure 1 is a diagrammatic side elevation of a hull constructed according to this invention. To more clearly demonstrate the lines upon which a hull should be built, transverse sections will be taken on the lines A, B, and C. Fig. 2 shows at A', B', and C' transverse sections taken on the lines A B C, above indicated, in Fig. 1, the external surface of the bottom being convex longitudinally and concave transversely.

Referring now to Fig. 1, it will be seen that on the line A there is a wedge of air confined between the sides D and the bottom E of the hull. As the vessel is propelled forward this wedge of air will disappear and its place be taken by a foaming or ebullient mass of aerated water. This aerated water cannot escape laterally, but must pass beneath the hull throughout its whole length, finally emerging from its confinement at the stern of the vessel, thereby greatly reducing the surface friction on the convex-concave external bottom. The vessel will, in point of fact, be supported partly upon a cushion of air confined between the segmental sides and the convex-concave external bottom. All other things being equal, the faster the vessel is propelled the greater will be its emergence from the water, until when a high speed is developed the hull will merely skim or glide over the surface of the water in a manner somewhat analogous to a sledge skimming or gliding over a hard surface of ice or snow.

Having now described my invention, what I claim as new, and desire to secure by Letters Patent, is—

The hull of a ship the deck of which is, approximately, oblong or parallelogram in shape, sides projecting vertically downward from the long edges of the parallelogram, such sides being, approximately, in the form of equal segments of a circle, and an external bottom which, longitudinally, is of the same convexity as the curved lower edges of the segmental sides, but, transversely, is concaved, as and for the purposes specified.

In witness whereof I have hereunto set my hand in presence of two witnesses.

HERBERT ERNEST ROSS.

Witnesses:
  ALBERT MASSEY,
  MANFIELD NEWTON.